(12) United States Patent
Sharivker et al.

(10) Patent No.: US 10,682,712 B2
(45) Date of Patent: Jun. 16, 2020

(54) CUTTING TOOL WITH ENHANCED CHIP EVACUATION CAPABILITY AND METHOD OF MAKING SAME

(71) Applicant: Kennametal Inc., Latrobe, PA (US)

(72) Inventors: Leonid Boris Sharivker, Nahariya (IL); Sergei Vladimir Boulakhov, Nahariya (IL)

(73) Assignee: KENNAMETAL INC., Latrobe, PA (US)

( * ) Notice: Subject to any disclaimer, the term of this patent is extended or adjusted under 35 U.S.C. 154(b) by 78 days.

(21) Appl. No.: 15/621,805

(22) Filed: Jun. 13, 2017

(65) Prior Publication Data
US 2018/0001398 A1 Jan. 4, 2018

Related U.S. Application Data

(62) Division of application No. 14/277,115, filed on May 14, 2014, now Pat. No. 9,724,768.

(51) Int. Cl.
| | |
|---|---|
| *B21K 5/04* | (2006.01) |
| *B23C 5/10* | (2006.01) |
| *B24B 3/02* | (2006.01) |
| *B21H 3/10* | (2006.01) |
| *B23P 15/32* | (2006.01) |

(52) U.S. Cl.
CPC .............. *B23C 5/10* (2013.01); *B21H 3/10* (2013.01); *B21K 5/04* (2013.01); *B24B 3/021* (2013.01); *B23C 2210/282* (2013.01); *B23C 2210/40* (2013.01); *B23P 15/32* (2013.01)

(58) Field of Classification Search
CPC .......... B21H 3/10; B21K 5/04; B21D 37/205; B21P 15/24; B23P 15/24; B23P 15/32
See application file for complete search history.

(56) References Cited

U.S. PATENT DOCUMENTS

| | | | |
|---|---|---|---|
| 571,253 A | * | 11/1896 | Wesselmann |
| 750,537 A | * | 1/1904 | Hanson |
| 1,747,117 A | * | 2/1930 | Klein .................... B23B 51/009 408/223 |

(Continued)

FOREIGN PATENT DOCUMENTS

| | | |
|---|---|---|
| CN | 1158580 A | 9/1997 |
| CN | 1168648 A | 12/1997 |

(Continued)

OTHER PUBLICATIONS

Jul. 8, 2017 Second Office Action.

(Continued)

*Primary Examiner* — Kenneth E Peterson
(74) *Attorney, Agent, or Firm* — Larry R. Meenan (57) ABSTRACT

A milling cutter having a shank and a cutting head attached to the shank. The cutting head has a plurality of helical teeth, each tooth including a cutting tip, a leading face and a rear face. A flute is defined between the leading face of a trailing tooth, and a rear face of an immediately preceding tooth. A gully of the flute is generally W-shaped in cross section to provide effective chip evacuation. A method for manufacturing the milling cutter with the W-shaped gully of the flute using a split path grinding process is also disclosed.

18 Claims, 10 Drawing Sheets

(56) References Cited

U.S. PATENT DOCUMENTS

| | | | |
|---|---|---|---|
| 2,769,355 A * | 11/1956 | Crisp | B23B 51/02 408/230 |
| 3,003,224 A | 10/1961 | Ribich | |
| 4,244,318 A | 1/1981 | Chen | |
| 4,895,102 A | 1/1990 | Kachel | |
| 5,049,009 A | 9/1991 | Beck | |
| 5,176,476 A | 1/1993 | Duffy | |
| D345,495 S | 3/1994 | Priddy | |
| 6,105,467 A | 8/2000 | Baker | |
| 6,164,876 A | 12/2000 | Cordovano | |
| 6,368,030 B1 | 4/2002 | Sato | |
| 6,991,409 B2 | 1/2006 | Noland | |
| 7,186,063 B2 | 3/2007 | Volokh | |
| D621,426 S | 8/2010 | Fusejima | |
| D626,575 S | 11/2010 | Washington, III | |
| 8,091,504 B2 | 1/2012 | Hsieh | |
| D654,935 S | 2/2012 | Kishimura | |
| D655,323 S | 3/2012 | Brockhage | |
| 8,211,234 B2 | 7/2012 | Rosenblatt | |
| D685,825 S | 7/2013 | Hoelbl | |
| D694,298 S | 11/2013 | Hoelbl | |
| 8,578,877 B2 | 11/2013 | Tajima | |
| 8,640,755 B2 | 2/2014 | Canale | |
| 8,671,872 B2 | 3/2014 | Pilipauskas | |
| 8,714,890 B2 | 5/2014 | Davancens | |
| D724,125 S | 3/2015 | Pierce | |
| 8,991,681 B2 | 3/2015 | Maki | |
| D737,875 S | 9/2015 | Santamarina | |
| D774,573 S | 12/2016 | Sharivker | |
| D792,489 S | 7/2017 | Sharivker | |
| D793,460 S | 8/2017 | Sharivker | |
| 9,724,768 B2 | 8/2017 | Sharivker | |
| D796,563 S | 9/2017 | Sharivker | |
| D797,170 S | 9/2017 | Sharivker | |
| 2002/0031409 A1 * | 3/2002 | Sato | B23C 5/10 407/53 |
| 2005/0053439 A1 * | 3/2005 | Wang | B23B 51/02 408/230 |
| 2006/0045637 A1 | 3/2006 | Flynn | |
| 2006/0045638 A1 | 3/2006 | Flynn | |
| 2006/0067797 A1 | 3/2006 | Calamia | |
| 2007/0098506 A1 | 5/2007 | Flynn | |
| 2007/0154272 A1 | 7/2007 | Wells | |
| 2007/0160429 A1 | 7/2007 | Volokh | |
| 2008/0219782 A1 | 9/2008 | Flynn | |
| 2009/0185878 A1 | 7/2009 | Turrini | |
| 2010/0092259 A1 * | 4/2010 | Borschert | B23B 51/02 408/230 |
| 2010/0209201 A1 | 8/2010 | Davis | |
| 2010/0215447 A1 | 8/2010 | Davis | |
| 2011/0081215 A1 * | 4/2011 | Nakamura | B23B 51/02 408/230 |
| 2011/0085862 A1 | 4/2011 | Shaffer | |
| 2011/0170973 A1 * | 7/2011 | Von Puttkamer | B23B 51/02 408/230 |
| 2011/0217132 A1 | 9/2011 | Wells | |
| 2011/0268513 A1 | 11/2011 | Takagi | |
| 2012/0183363 A1 | 7/2012 | Davis | |
| 2012/0282044 A1 | 11/2012 | Volokh | |
| 2013/0118313 A1 * | 5/2013 | Mehrotra | B23C 3/32 76/108.6 |

FOREIGN PATENT DOCUMENTS

| | | |
|---|---|---|
| CN | 101622097 A | 1/2010 |
| CN | 102430963 A | 5/2012 |
| CN | 102513885 A | 6/2012 |
| DE | 10015492 A1 | 10/2000 |
| DE | 10016844 B4 | 10/2009 |
| EP | 329624 A2 | 8/1989 |
| GB | 2446036 A | 7/2008 |
| GB | 2495200 | 4/2013 |
| JP | 62188616 A2 | 8/1987 |
| JP | 07237018 A | 9/1995 |
| JP | 8168915 | 7/1996 |
| JP | 2006110683 | 4/2006 |

OTHER PUBLICATIONS

Mar. 27, 2019 Foreign OA.
Oct. 13, 2015 First Office Action.
Mar. 28, 2016 Office Action (3 months) 1.
Jan. 2, 2018 First Office Action.
Apr. 26, 2016 Office Action (3 months) 1.
May 17, 2016 First Office Action.
Aug. 18, 2016 Final Office Action.
Aug. 1, 2018 Office Action (non-US).
Sep. 3, 2018 Office Action (non-US).
Dec. 19, 2017 Third Office Action.
Apr. 21, 2017 Office action (3 months) 1.

\* cited by examiner

CUTTING TOOL WITH ENHANCED CHIP EVACUATION CAPABILITY AND METHOD OF MAKING SAME

CROSS-REFERENCE TO RELATED APPLICATIONS

This application under 35 USC § 120 is a division of co-pending U.S. patent application Ser. No. 14/277,115, filed on May 14, 2014, which is incorporated herein by reference in its entirety, and which itself claims priority under 35 USC § 119(a) to Israel Patent Application No. 232079, filed on Apr. 10, 2014, which is also incorporated herein by reference in its entirety.

BACKGROUND OF THE INVENTION

Field of the Invention

The invention pertains to the field of cutting tools, More particularly, the invention pertains to a multi-flute cutting tool having a flute that is W-shaped in cross section for superior chip evacuation(i.e., removal of swarf).

Description of Related Art

Figure 8:
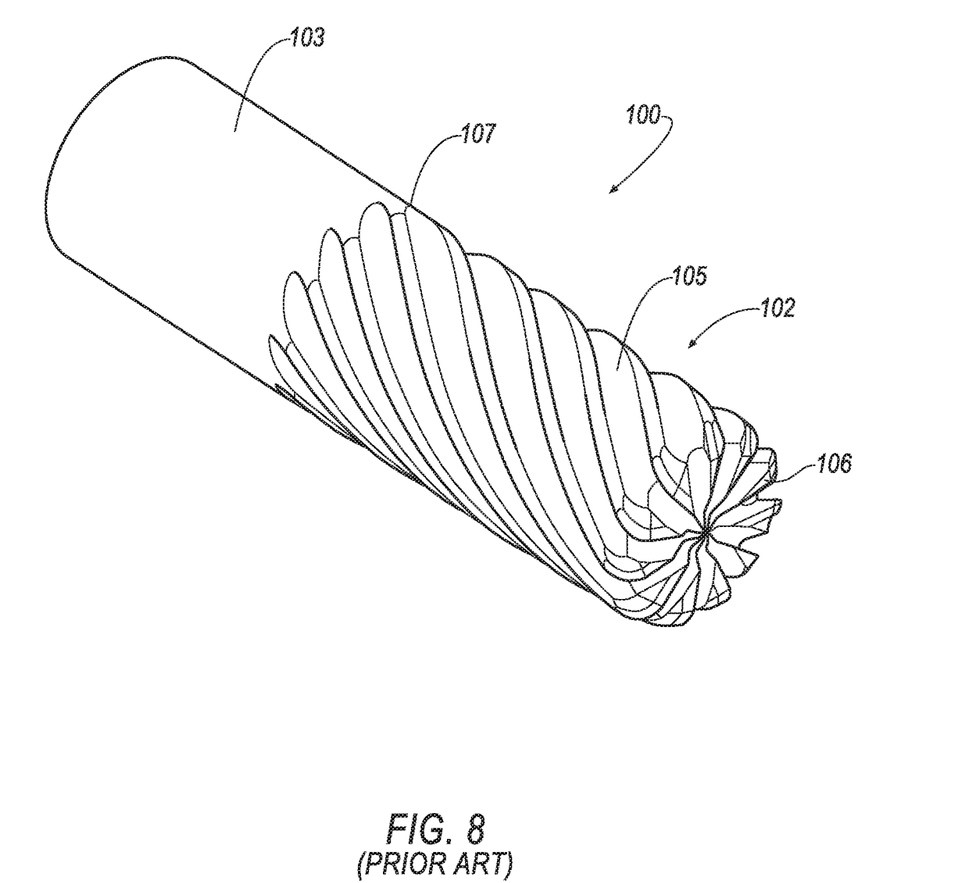
FIG. 8 is an isometric view of a conventional milling cutter.
Figure 9:
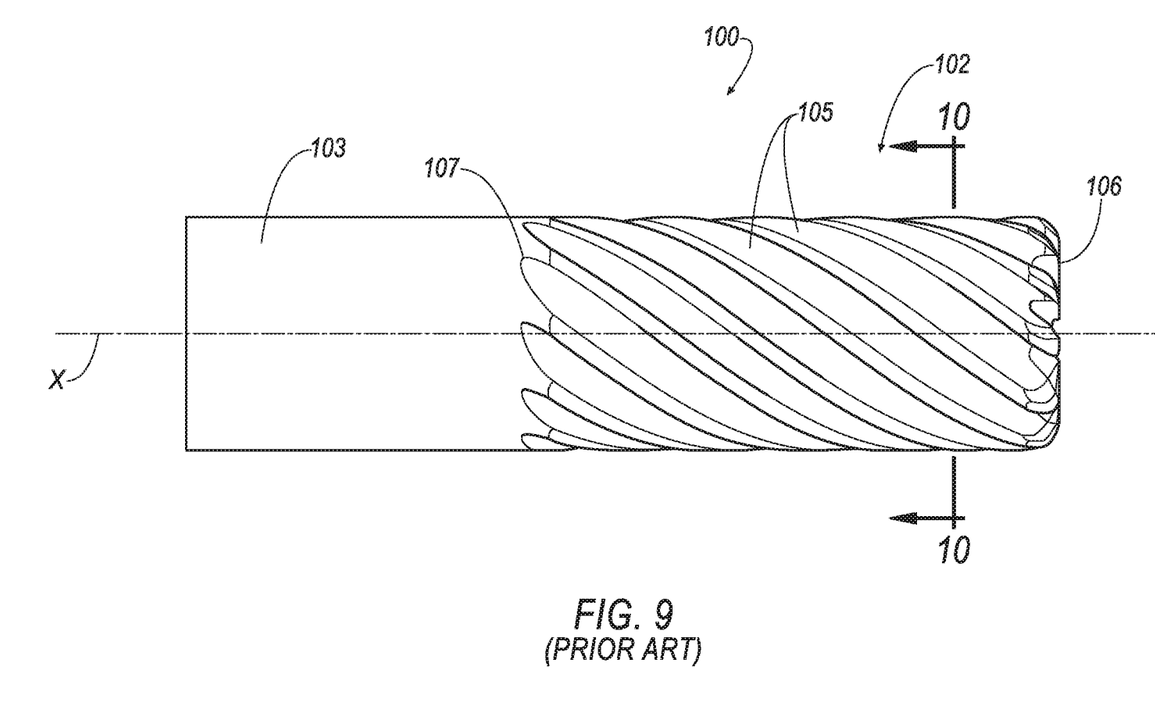
FIG. 9 is a side view of the conventional milling cutter of FIGS. 8.
Figure 10:
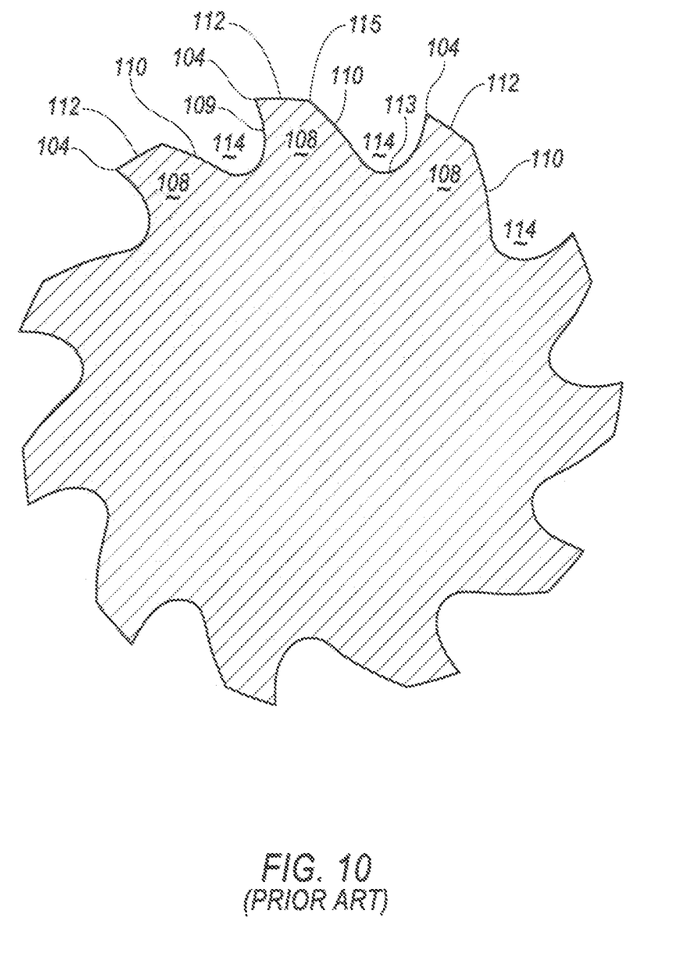
FIG. 10 is a cross-sectional view of the conventional milling cutter taken along line 10-10 of FIG. 9.

A conventional milling cutter 100 is illustrated in FIGS. 8-10. The cutter 100 has a cutting head 102 and a coaxial integral shank 103 for securing in a chuck or arbour of a machine tool for rotation about an axis X.

The cutting head 102 has a plurality of helical flutes 105 extending from a leading end 106 of the head 102, to a trailing end 107 of the head 102. Each flute 105 has a tooth 108 provided with a leading face 109 and a rear face 110, as shown in FIG. 10. The leading face 109 faces the direction of rotation of the cutter 100 when in use and has a cutting tip 104.

As shown in FIG. 10, each tooth 108 also has a primary relief rake facet 111 which, in the example illustrated, is planar. The primary facet 111 comprises a land, which extends rearwardly from the tip 104 of the leading edge 109 of the tooth 108 to a heel 115.

The leading face 109 of a trailing tooth 108, and a rear face 110 of the immediately preceding tooth 108 diverge and define, together with a flute base 113, a gully 114. The gully 114 is provided for swarf removal purposes and is designed so that in use the swarf generated during cutting is carried away without clogging the cutter. This is achieved by controlling the pitch of the teeth, the depth of the gully 114 and the width of the land of the primary facet 111.

As described above, the geometry of rotating cutters includes many features and elements, each of them playing a role in achieving desired performance goals. The most basic geometry element is a flute, otherwise known as a groove, a plurality of which forming rake edges, rake faces, teeth and eventually serving as a chip (i.e., swarf) formation and evacuation channel. The flute geometry or flute shape makes the difference between success and failure in workpiece milling applications. Conventionally, the rake face, flute core and flute back is formed by a single movement (i.e. grinding path), where cross sectional shape of the flutes are formed as a result of mathematical calculations based on input including the flute core, rake angle, depth of the rake angle measurements, tooth width (or attack angle), grinding wheel shape and flute core profile along the axis of rotation.

The aforementioned input imposes strict bounds for the calculations, resulting in certain flute shapes to be mathematically impossible to achieve. As a result, the majority of flute cross-sectional shapes have very much in common that relies on having as much as flute depth as possible, while maintaining the desired tooth width to provide the desired volume for chip evacuation.

The disadvantage of the common flute shape can be seen in the resultant shape of the rear face 110 of the flute 105, where a bulge of substrate material is left, thereby reducing the volume of the flute 105 without adding much strength. This disadvantage becomes much more distinct when implementing multi-flute milling cutters with seven (7) or more flutes. Shortage of available space impose an insolvable task for common flutes to provide enough volume for chip evacuation, while providing sufficient tooth width. As a result, many conventional multi-flute cutters have problems with the adequate evacuation of chips.

SUMMARY OF THE INVENTION

The problem of providing effective chip evacuating in multi-flute cutting tools is solved by providing a multi-flute cutting tool with flutes having a W-shape in cross section. The distinct visual different is in removing the flute back bulge. The resultant flute shape cannot be achieved using conventional flute calculations. Rather, it is necessary to split the calculation and grinding path of the rake face and the flute core from the flute back in a split path grinding process.

In one aspect of the invention, a solid mill cutter comprises a shank; a cutting head attached to the shank, the cutting head having a plurality of helical teeth, each tooth including a cutting tip, a leading face and a rear face; and a flute defined between the leading face of a trailing tooth, and a rear face of an immediately preceding tooth, wherein a gully of the flute is W-shaped in cross section to provide effective chip evacuation.

In another aspect of the invention, a method of manufacturing a milling cutter having a cutting head, a shank and a flute that is W-shaped in cross section, the method comprising:

grinding a plurality of helical flutes into the outer periphery of a cutter blank in a first grinding operation using a peripheral area of a grinding wheel with a profile and rotatable about an axis transverse to an axis, X, of the milling cutter, the peripheral area simultaneously producing a positive or negative radial rake angle on a leading face of a trailing tooth, and a first flute base;

moving the grinding wheel toward a preceding tooth; and grinding a second flute base in a second grinding operation, thereby forming a flute that is W-shaped in cross section.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

A cutting tool 1, for example, a milling cutter, is shown in FIGS. 1-5 according to an embodiment of the invention. Although a milling cutter 1 is shown in the illustrated embodiment, the principles of the invention described below can be applied to other rotary cutting tools, such as solid drills, taps, reamers, and the like. The milling cutter 1 has a cutting head 2 and a coaxial integral shank 3 for securing in a chuck or arbor of a machine tool for rotation about an axis, X.

The cutting head 2 has a plurality of helical flutes 5 extending from a leading end 6 of the head 2, to a trailing end 7 of the head 2. In the illustrated embodiment, the cutting head 2 has a total of fifteen (15) flutes 5. However, it will be appreciated that the invention can be practiced with any desirable number of flutes 5, depending on the dimensions of the milling cutter 1. For example, a milling cutter 1 having a relatively large cutting diameter D has the capability of having a greater number of flutes than a milling cutter with a relatively smaller cutting diameter D, and vice versa, Thus, the milling cutter 1 can have as few as six (6) flutes 5 (and teeth 8) to as many as thirty (30) flutes 5 (and teeth 8), and a cutting diameter, D, between about 6 mm and about 35 mm.

Figure 1:
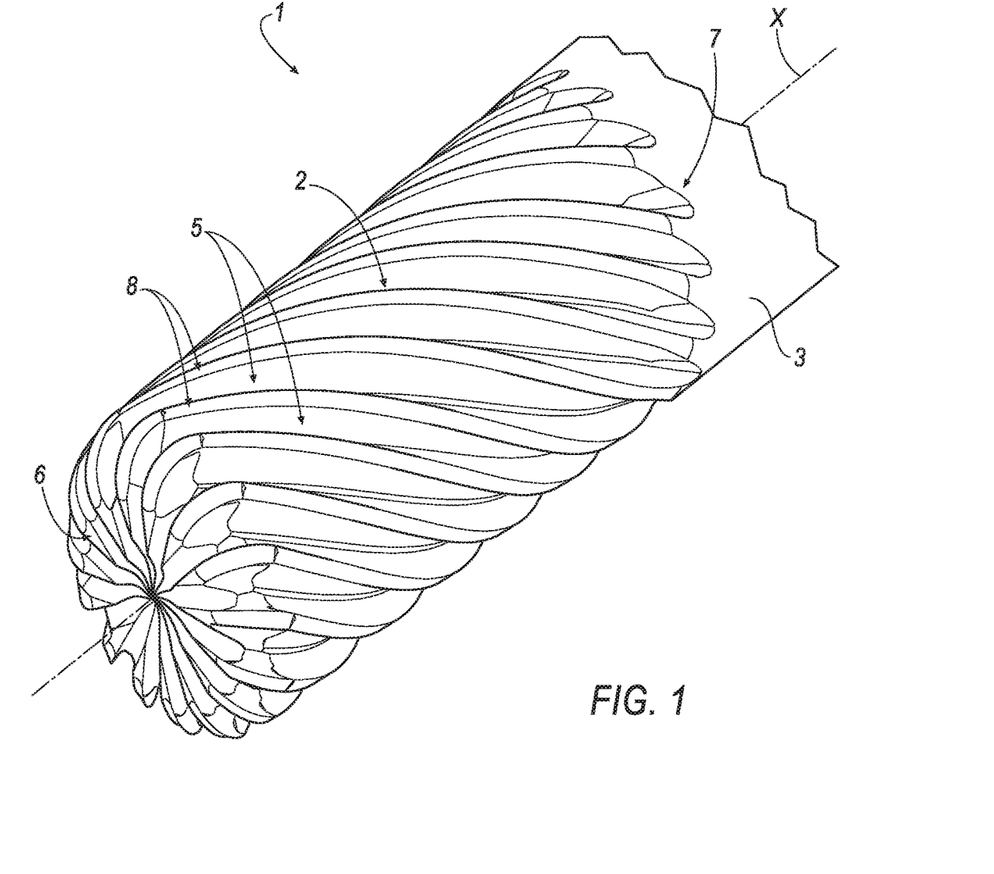
FIG. 1 is an isometric view of a milling cutter with a W-shaped gully according to an embodiment of the invention.
Figure 2:
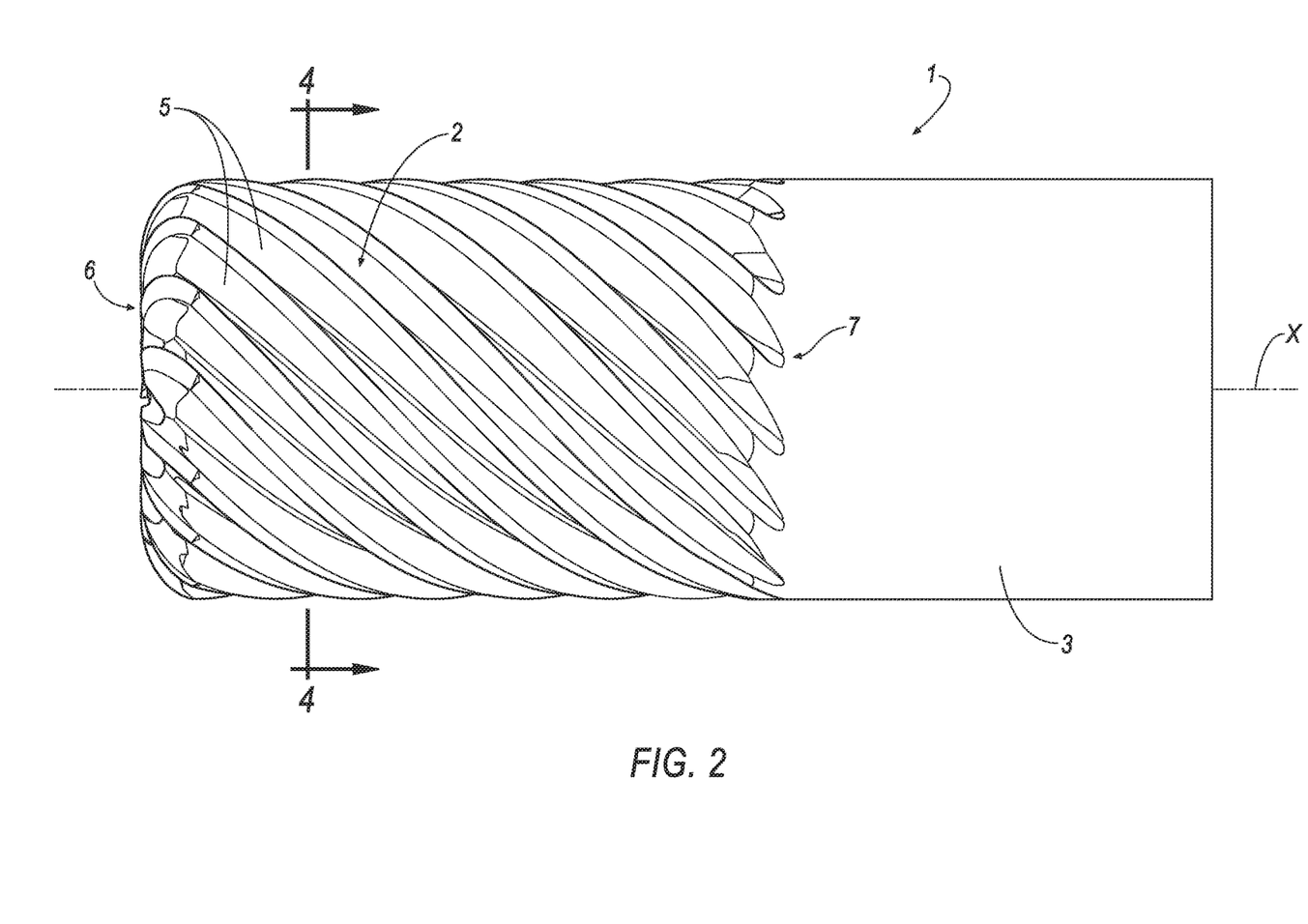
FIG. 2 is a side view of the milling cutter of FIG. 1.
Figure 3:
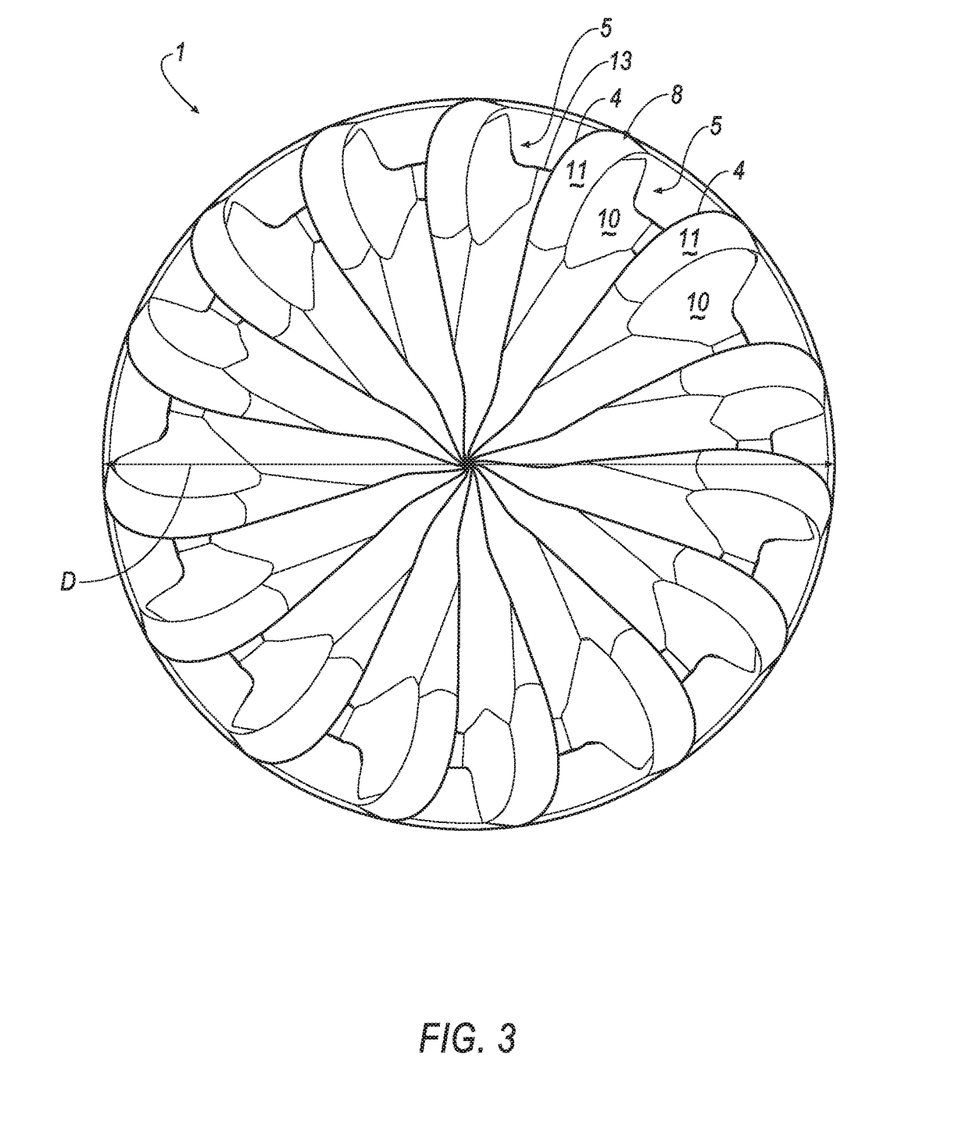
FIG. 3 is an end view of the milling cutter of FIG. 1.
Figure 4:
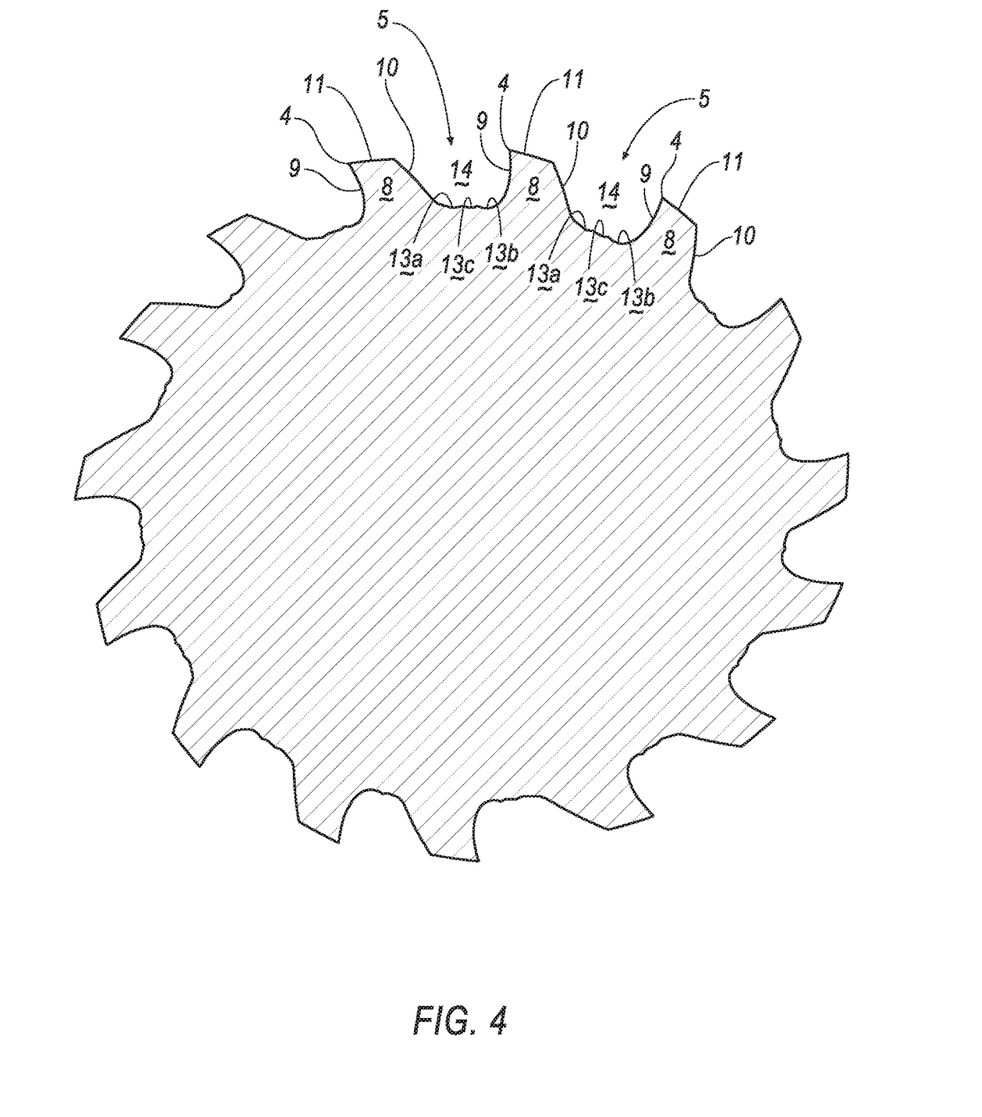
FIG. 4 is a cross-sectional view of the milling cutter taken along line 4-4 of FIG. 2.
Figure 5:
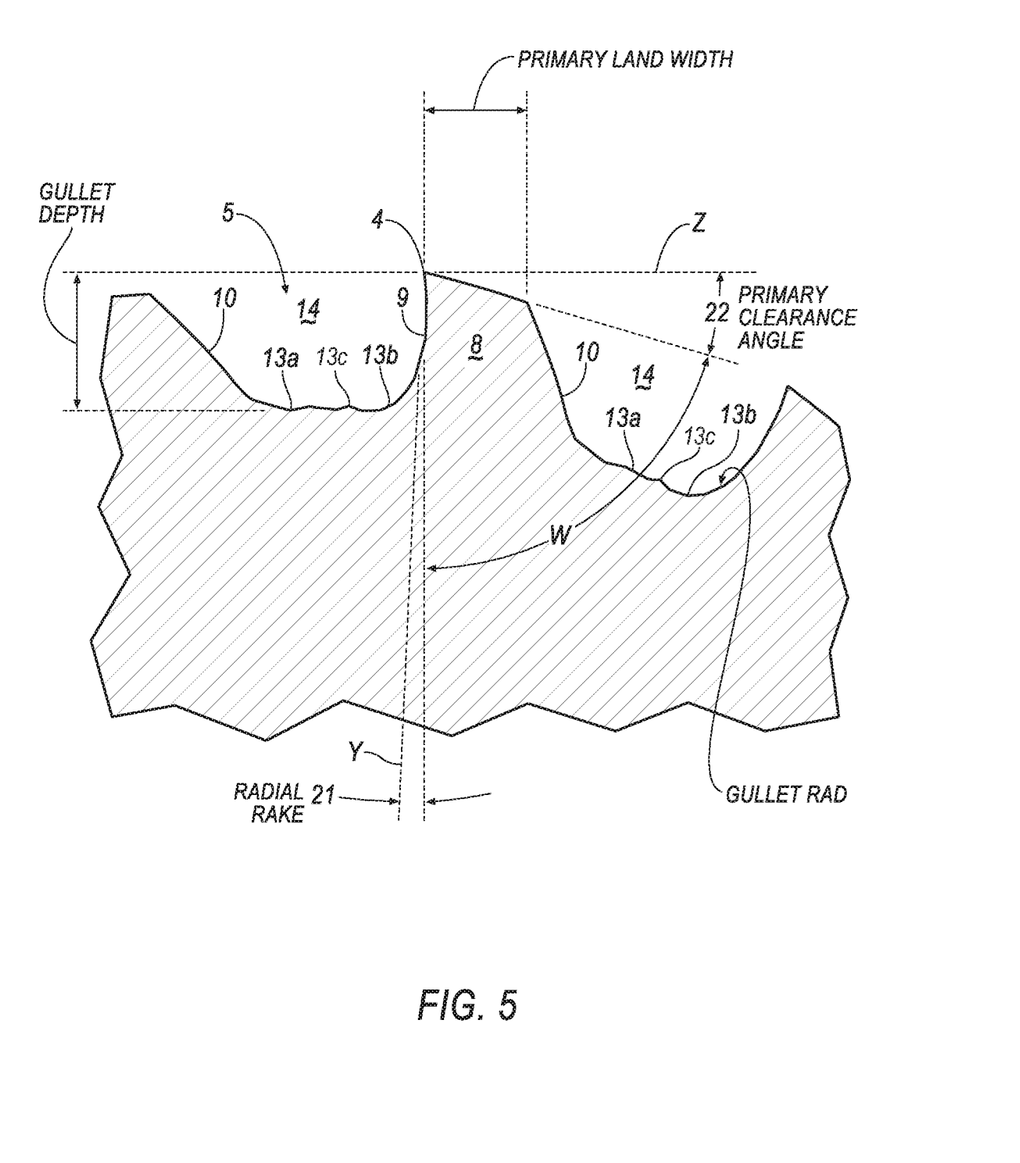
FIG. 5 is an enlarged cross-sectional view of one of the teeth shown in FIG. 4.

Each flute 5 has a tooth 8 provided with a leading face 9 and a rear face 10, as shown in FIG. 4. The leading face 9 faces the direction of rotation of the cutter 1 when in use and has a cutting tip 4. The cutting tip 4 of each of the teeth 8 lie on the circumference of a pitch circle having a diameter, D. The leading face 9 has a positive radial rake angle 21. The radial rake angle 21 is the angle that the inclined leading face 9 makes with a radial line Y, as shown in FIG. 5, extending from the tool axis, X, to the tip 4 of a tooth 8. In one embodiment, the angle 21 is in a range between about −15 degrees to about +15 degrees, depending on the material being cut, and a zero radial rake angle 21 may be required for some materials.

As shown in FIG. 5, each tooth 8 also has a primary relief rake facet 11 which, in the example illustrated, is planar. The primary facet 11 comprises a land which extends rearwardly from the tip of the leading edge 9 of the tooth 8. The primary facet 11 is inclined at an angle to a tangent, Z, extending from the pitch circle at the tooth tip 4. This angle is referred to as the primary clearance angle 22, and is of the order of approximately 5 degrees to approximately 10 degrees. Alternatively however the primary relief rake facet is not planar, but is eccentric or convex, providing more material, and hence greater strength for each tooth 8.

The primary clearance angle 22 is used to define the geometry of the double ratchet tooth form. By controlling the angle 22, the geometry of the tooth can be defined in the manufacturing process.

The leading face 9 of a trailing tooth 8, and a rear face 10 of the immediately preceding tooth 8 define a flute base 13 and a gully 14 therebetween. The gully 14 is provided for swarf removal purposes and is designed so that in use the swarf generated during cutting is carried away without clogging the cutter 1. This is achieved by controlling the pitch of the teeth, the depth of the gully 14 and the width of the land of the primary facet 11.

One aspect of the invention is that the gully 14 of the flute 5 is generally W-shaped in cross section, as shown in FIG. 5. By comparing FIGS. 5 and 11, it is readily apparent that the W-shaped gully 14 of the flute 5 is visually different than the gully 114 of the flute 105. Specifically, the W-shaped flute 5 of the cutting tool 1 of the invention has two flute bases 13a, 13b that may be separated by a small ridge 13c by using a split path grinding process. As a result, the W-shaped gully 14 of the flute 5 has additional volume (i.e., a larger cross-sectional area), as compared to the conventional gully 114. This additional volume is especially valuable for multi-flute cutting tools, and in particular multi-flute cutting tools having unequal indexing (i.e. unequal spacing between teeth). In another embodiment, the small ridge 13c is very smooth or eliminated. This distinct visual difference is from removing the bulge 125 in the rear face 110 in the gully 114 of the conventional flute 105 that is shown in FIG. 11. In doing so, the secondary clearance surface 112 in the conventional cutting tool 100 is essentially removed from the milling cutter 1 of the invention, resulting in the gully 14 having additional volume as compared to the conventional gully 114. It has been shown by the inventors that the W-shaped gully 14 of the flute 5 of the invention provides superior swarf evacuation as compared to the flute 105 of the conventional milling cutter 100.

Figure 6:
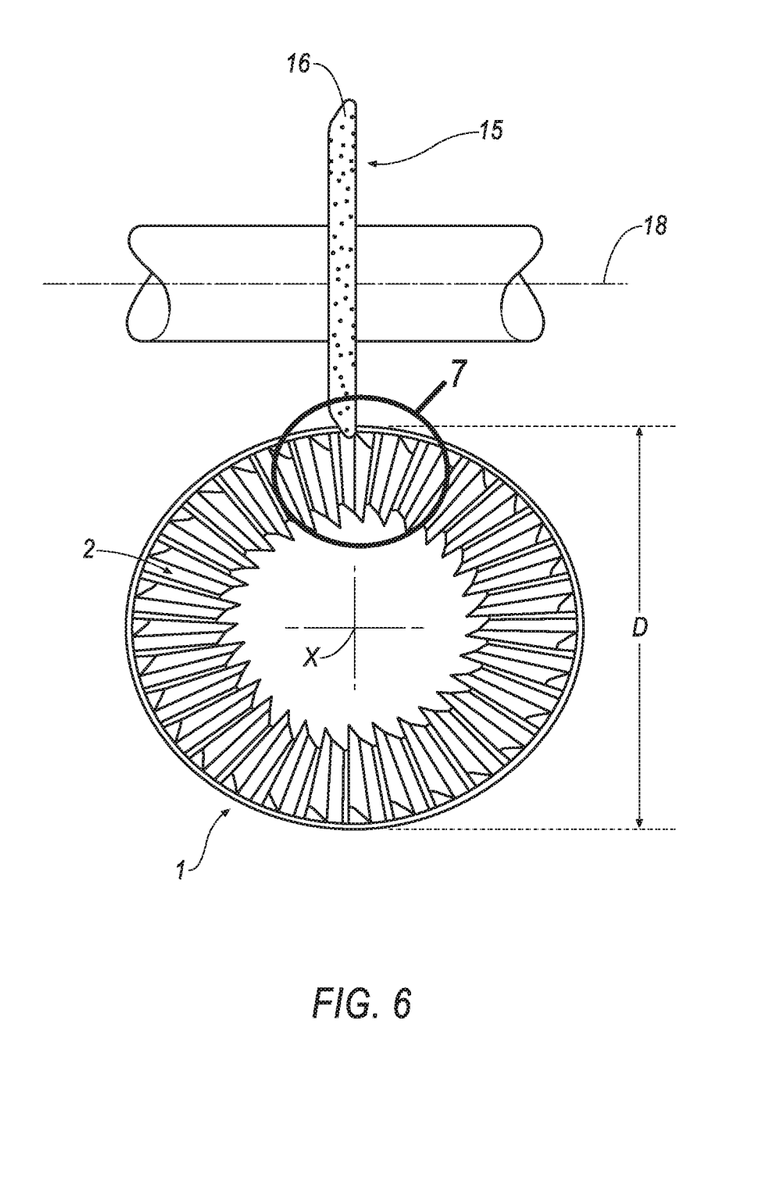
FIG. 6 shows a first grinding operation in the split path grinding process for forming the flutes and the W-shaped gully according to a method of the invention.

A method of forming the W-shaped flute 5 of the invention will now be described. As shown in FIG. 6, the W-shaped flute 5 is basically formed using a split path grinding process.

In the split grinding process, a grinding wheel 15 has a profile peripheral area 16 with a corner radii 17 required for forming the flute base 13a, and is rotated about an axis 18 extending generally transversely to axis X of the milling cutter 1. As seen in FIG. 6, in a first grinding operation, the corner radii 17 of the grinding wheel 15 grinds individual flutes 5 into the outer periphery of a cutter blank from the leading end 6 towards the shank 3. In addition, the positive rake angle is formed on the leading face 9 (of a trailing tooth 8), while simultaneously forming the flute base 13b. Alternatively, the periphery area 16 of the grinding wheel 15 may grind the individual flutes 5 into the outer periphery of a cutter blank from the shank 3 toward the leading end 6 of the head 2.

Figure 7:
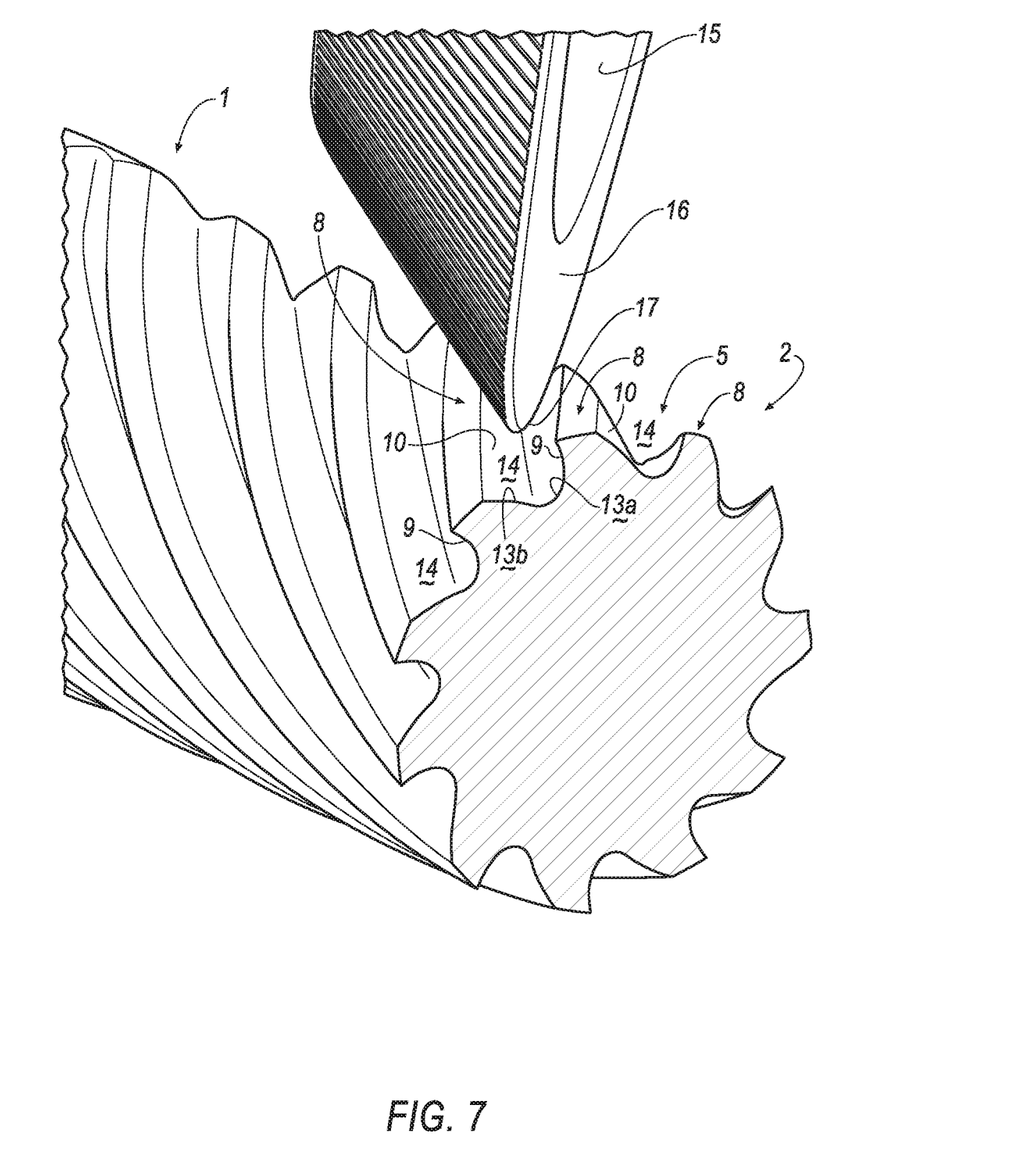
FIG. 7 is an enlarged cross-sectional view showing the a second grinding operation in the split path grinding process for forming the W-shaped gully according to the method of the invention.

As shown in FIG. 7, the grinding wheel 15 is then moved toward the preceding tooth 8 and a second grinding operation is performed. Specifically, the grinding wheel 15 is simultaneously moved with respect to at least three (3) axes and up to five (5) axes to grind the flute base 13a and produce the gully 14 having a generally W-shape in cross section. As a result, the gully 14 of the invention has additional volume as compared to the conventional gully 114. Optionally, a small ridge 13c (FIG. 4) separating the flute bases 13a, 13b may be produced by the grinding of the flute base 13a, depending on the movement of the grinding wheel 15.

In general, the method of the invention has several distinct features:

1) A flute 5 can be ground either from the leading end 6 of the head 2 toward the shank 3 of the head 2, or from the shank 3 to the leading end 6 of the head 2.

2) The grinding wheel 15 can have a variety of profile shapes and is not limited to a frusto-conical profile shape.

3) The rake face or leading face 9 and bases 13a, 13b of the flute 5 is produced by the corner radii 17 of the grinding wheel 15 and not by the peripheral part 16 of the grinding wheel 15.

4) The flute back or rear face 10 is produced by the corner radii 17 of the grinding wheel 15.

5) The peripheral part 16 of the grinding wheel 15 does not contribute to the formation of the rake face or leading face 9 and flute bases 13a, 13b.

6) The radial rake angle 21 can be either positive or negative in a range between about +15 degrees to about −15 degrees.

7) The rake face or leading face 9 can have both a negative and positive radial rake angles.

8) The gully 14 of the flute 5 is produced by implementing a split path grinding process in which the first path produces the flute rake face or leading face 9, and the subsequent paths (second, third, etc.) produce the profile for the flute back or rear face 10.

9) As a result of the split path grinding process of the invention, a gully 14 with the W-shaped cross section can either be smooth or have certain transition marks at the flute bases 13a, 13b or rear face 10.

10) The split path grinding process of the invention is a result of split flute calculations in which the rake face and flute back are calculated using different input values that produce different grinding wheel paths. It is noted that the profile of the grinding wheel 15 is part of the input. However, the calculations are much more complex and involves the grinding wheel 15 to move simultaneously about at least three axes (up to five axes) using mostly the corner radii 17 of the grinding wheel 15, unlike conventional grinding processes that use the peripheral part of the grinding wheel.

11) in a less flexible implementation of the grinding process to produce the gully 14 with the W-shaped cross section, a grinding wheel 15 with a special profile cart be used in which the gully 14 can be produced with a single path with all the elements of the profile of the grinding wheel 15 contributing to the formation of the W-shaped gully 14.

Several distinct advantages of the W-shaped flute 5 of the invention include, but is not limited to:

1) providing more flutes for a given cutting diameter than the conventional cutting tool;

2) providing a flute shape with enough volume for effective chip formation and evacuation while preserving tool strength;

3) providing multi-flute (up to 25 flutes for a cutting diameter of 1 inch) with unequal index to suppress chattering;

4) providing the capability of using relatively larger core diameters, thereby increasing the tool strength;

5) providing the capability of using relatively larger core diameters so as to accommodate internal coolant channels while preserving tool strength;

6) reliable mass production of the tool using the split grinding process; and 7) reducing friction of a swarf (i.e. chips) against flute surfaces.

The patents and publications referred to herein are hereby incorporated by reference.

Having described presently preferred embodiments the invention may be otherwise embodied within the scope of the appended claims.

What is claimed is:

1. A method of manufacturing a milling cutter, said method comprising:
   providing a grinding wheel which has a predetermined profile and is rotatable about an axis different from a longitudinal axis of the milling cutter; and
   using the grinding wheel to grind a helical flute into an outer periphery of a cutter blank, via at least a first grinding path and a subsequent, second grinding path;
   wherein, via said first grinding path, the grinding wheel produces a leading face of a first tooth, and a first flute base;
   wherein, via said second grinding path, the grinding wheel produces:
      a flute back, the flute back comprising a second tooth rear face having a different profile than the leading face of the first tooth due to the predetermined profile of the grinding wheel; and
      a second flute base;
   whereby a gully of the helical flute is defined by the leading face of the first tooth, the rear face of the second tooth, and the first and second flute bases;
   the gully having a ridge between the first and second flute bases to aid in effective chip evacuation; and
   wherein, the first flute base is disposed radially inwardly of the leading face of the first tooth, and the second flute base is disposed radially inwardly of the rear face of the second tooth.

2. The method according to claim 1, wherein the first grinding path and the second grinding path are calculated separately from one another, using different sets of one or more input values.

3. The method according to claim 1 wherein, via said first grinding path, the grinding wheel produces a positive or negative radial rake angle on the leading face of the first tooth.

4. The method according to claim 3 wherein, in said first grinding operation, the grinding wheel simultaneously produces:
   the positive or negative radial rake angle on the leading face of the first tooth; and
   the first flute base.

5. The method according to claim 3, wherein the leading face has a radial rake angle of between about −15 degrees and about +15 degrees.

6. The method according to claim 1, comprising moving the grinding wheel after undertaking the first grinding path and prior to undertaking the second grinding path.

7. The method according to claim 6, wherein said moving comprises moving the grinding wheel with respect to at least three axes and up to five axes to produce the gully.

8. The method according to claim 1, wherein the grinding wheel is rotatable about an axis transverse to the longitudinal axis of the milling cutter.

9. The method according to claim 1, wherein using the grinding wheel in said first and second grinding operations comprises employing a corner radius area of the grinding wheel.

10. The method according to claim 9, wherein the grinding wheel is generally frustoconical in shape.

11. The method according to claim 1, wherein the helical flute is ground from a leading end of the blank toward the shank, wherein the leading end is distal from the shank.

12. The method according to claim 1, wherein the helical flute is ground from a shank of the blank toward a leading end of the blank, wherein the leading end is distal from the shank.

13. The method according to claim 1, wherein the first tooth comprises a primary relief rake facet which is straight when viewed in cross-section.

14. The method according to claim 13, wherein:
the first tooth comprises a rear face; and
the primary relief rake facet extends entirely between the leading face of the first tooth and the rear face of the first tooth, and connects directly with both the leading face of the first tooth and the rear face of the first tooth.

15. The method according to claim 13, wherein the primary relief rake facet has a primary clearance angle of between 5 and 10 degrees.

16. The method according to claim 1, wherein the milling cutter has between 6 and 50 teeth.

17. The method according to claim 1, wherein the first tooth has a wedge angle of between 60 and 90 degrees.

18. The method according to claim 1, wherein the milling cutter has cutting diameter of between about 10 mm and about 25 mm.

\* \* \* \* \*